United States Patent [19]
Sorensen

[11] Patent Number: 5,861,936
[45] Date of Patent: Jan. 19, 1999

[54] REGULATING FOCUS IN ACCORDANCE WITH RELATIONSHIP OF FEATURES OF A PERSON'S EYES

[75] Inventor: Jens Ole Sorensen, Cayman Kai, Cayman Islands

[73] Assignee: Gillan Holdings Limited, Cayman Islands

[21] Appl. No.: 893,788

[22] Filed: Jul. 11, 1997

Related U.S. Application Data

[63] Continuation-in-part of Ser. No. 688,012, Jul. 26, 1996, abandoned.

[51] Int. Cl.$^6$ .............................. A61B 3/00; A61B 3/14
[52] U.S. Cl. ......................... 351/200; 351/209; 359/354
[58] Field of Search .................................. 351/200, 204, 351/209, 210, 246, 221; 359/354, 676; 349/13, 33, 200

[56] References Cited

U.S. PATENT DOCUMENTS

| | | | |
|---|---|---|---|
| 4,181,408 | 1/1980 | Senders | 351/41 |
| 4,300,818 | 11/1981 | Schachar | 351/206 |
| 5,067,795 | 11/1991 | Senatore | 359/84 |
| 5,309,185 | 5/1994 | Harper | 351/202 |
| 5,357,293 | 10/1994 | Uomori et al. | 351/209 |
| 5,359,444 | 10/1994 | Piosenka et al. | 359/94 |
| 5,382,989 | 1/1995 | Uomori et al. | 351/209 |
| 5,410,376 | 4/1995 | Cornsweet et al. | 351/210 |
| 5,446,834 | 8/1995 | Deering | 395/127 |

FOREIGN PATENT DOCUMENTS

| | | |
|---|---|---|
| 066547A2 | 8/1995 | European Pat. Off. |
| 05211625 | 8/1993 | Japan . |
| WO95/05052 | 2/1995 | WIPO . |

*Primary Examiner*—Huy Mai
*Attorney, Agent, or Firm*—Edward W. Callan

[57] ABSTRACT

The focus of variable-focus lenses in eyeglasses worn by a person is regulated in accordance with an indication of a spatial relationship of features of the person's eyes to provide an at least partially in-focus image of a feature at which the person is gazing.. The lenses are nematic liquid crystal display devices. Light reflected off of each of the person's eyes is detected to provide data indicating the respective dispositions of the person's eyes; and the combined data for both eyes is processed by a neural network in a computer to provide focus-control signals for setting the focus of each lens. At least partially in-focus images are also provided of features at which a person in gazing (a) through goggles of a three-dimensional virtual reality system, (b) on a monitor that perceptually simultaneously displays different features with different degrees of focus as though they were at different distances from a person viewing the monitor, (c) on a monitor displaying remotely generated images and (d) through a view finder of a camera.

27 Claims, 4 Drawing Sheets

REGULATING FOCUS IN ACCORDANCE WITH RELATIONSHIP OF FEATURES OF A PERSON'S EYES

CROSS REFERENCE TO RELATED APPLICATION

This is a continuation-in-part of U.S. patent application Ser. No. 08/688,012 filed Jul. 26, 1996

BACKGROUND OF THE INVENTION

The present invention generally pertains to optical systems and methods and is particularly directed to providing an at least partially in-focus image of a feature at which a person is gazing. Gazing at a feature means perceiving a combined left-eye and a right-eye representation of the feature. A feature can be virtual and does not have to exist in real space. An "in-focus image of a feature" is a clear one-eye or two-eye representation of the feature.

U.S. Pat. No. 5,359,444 describes auto-focusing eyeglasses including lenses containing liquid crystal nematic materials with variable refractive indexes which change in response to a voltage applied across the liquid crystal lens materials. The applied voltage changes the refractive index in accordance with a measured distance to a feature at which a person is gazing so that the lenses are automatically focused as the person gazes at different features that are different distances away. The distance is measured by an infrared ranging system mounted on the frame of the eyeglasses; and the voltage applied across the liquid crystal lens materials is adjusted in accordance with the distance measurement determined by processing an infrared ranging signal with a microprocessor built into the frame of the eyeglasses. A cornea tracking system is used to measure the orientation of the eye by an infrared signal reflected from the cornea in order to provide a fine signal, which in combination with the ranging signal provides information about the temporal location of the line of vision. In operation, a person wearing the eyeglasses faces the feature at which he is gazing in order to point the eyeglasses at such feature, whereupon the focus of the lenses is automatically regulated in accordance with the measured distance to the feature as determined by processing the infrared ranging signal provided by the infrared ranging system mounted on the frame of the eyeglasses.

SUMMARY OF THE INVENTION

The present invention provides a more reliably focused image of the feature at which the person is gazing by regulating the variable-focus means in accordance with an indicated spatial relationship of the person's eyes.

The present invention provides a system for providing an at least partially in-focus image of a feature at which a person is gazing, comprising variable-focus means for providing an image of the feature on a display screen; means for indicating a spatial relationship of the person's eyes; and means for regulating the variable-focus means in accordance with the indicated relationship.

The present invention also provides a method of providing an at least partially in-focus image of a feature at which a person is gazing, comprising the steps of:

(a) using variable-focus means to provide an image of the feature on a display screen;

(b) indicating a spatial relationship of features of the person's eyes; and (c) regulating the variable-focus means in accordance with the indicated relationship.

Additional features of the present invention are described with reference to the detailed description of the preferred embodiments.

BRIEF DESCRIPTION OF THE DRAWING

FIG. 2 is not drawn to scale.

DETAILED DESCRIPTION

Figures 1, 2:
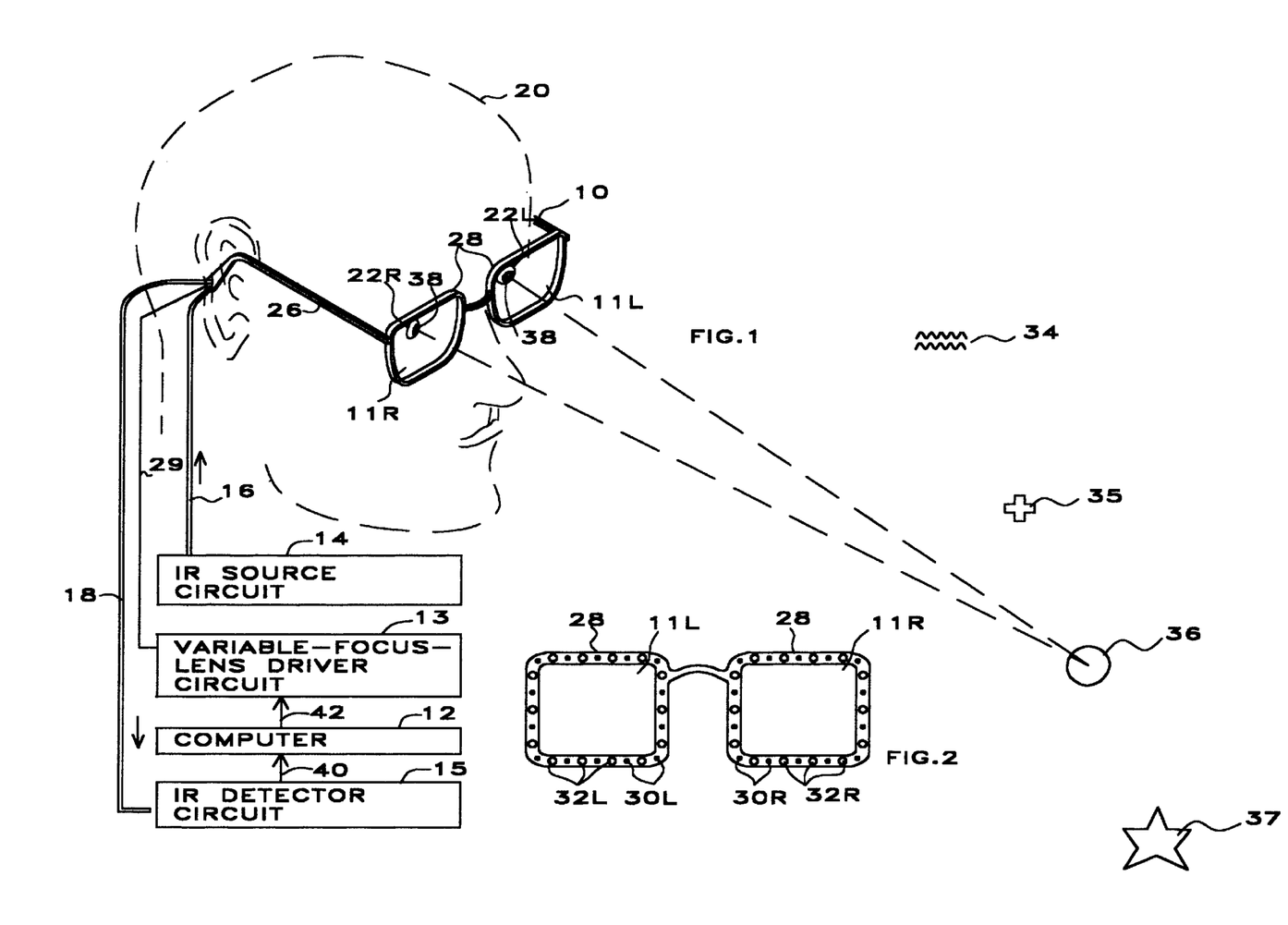
FIG. 1 is a schematic diagram of a preferred embodiment of a system according to the present invention in which the variable focus means are embodied in eyeglasses being worn by a person gazing at a given feature.
FIG. 2 illustrates arrays of optical fibers disposed in the frames of the eyeglasses of antic the system of FIG. 1 as viewed by a person wearing the eyeglasses.

Referring to FIG. 1, a preferred embodiment of a system according to the present invention includes eyeglasses 10 having a pair of variable-focus lenses 11, a computer 12, variable-focus-lens driver circuits 13, an IR (infrared light) source circuit 14, an IR detector circuit 15, a first bundle of optical fibers 16 and a second bundle of optical fibers 18. The eyeglasses 10 are disposed on a person 20 in such a correlation to a person's eyes 22L, 22R as to affect the person's perceived focus of images.

Each of the variable-focus lenses 11 is a nematic liquid crystal display device. The conductive plates of the liquid crystal display device are connected to the variable-focus-lens driver circuits 13 by wires 24 extending through a stem 26 of the eyeglasses 10 from electrical contacts (not shown) disposed in the portions of the eyeglasses frame 28 that surround the lenses 12 to selectively apply appropriate control voltages to the respective conductive plates of the liquid crystal display devices.

The first bundle of optical fibers 16 extend from the IR source circuit 14 into and through a stem 26 of the eyeglasses 10 and terminate in a pair of left and right fiber-optic transmitter arrays 30L, 30R respectively disposed in the portions of the eyeglasses frame 28 that surround the left variable-focus lens 11L and the right variable-focus lens 11R, as shown in FIG. 2. The second bundle of optical fibers 18 originate in a pair of left and right fiber-optic detector arrays 32L, 32R alternately disposed with the optical fibers of the respective fiber-optic transmitter arrays 30L, 30R in the portions of the eyeglasses frame 28 that surround the left variable-focus lens 11L and the right variable-focus lens 11R and extend through and out of the stem 26 of the eyeglasses 10 to the IR detector circuit 15. The numbers of optical fibers in each of the respective fiber-optic transmitter arrays 30L, 30R and fiber-optic detector arrays 32L, 32R preferably are more than as shown in FIG. 2.

The spatial relationship of features of a person's eyes 22L, 22R varies as the person 20 gazes at various features 34, 35, 36, 37 (FIG. 1) that are located at different distances and, at different angles from the person's eyes 22L, 22R. For example, when the feature 36 at which the person is gazing is closer to the person's eyes 22L, 22R than a more distant feature 37, the pupils 38 of the person's eyes 22L, 22R are closer together than they would, be if the person 20 were to gaze at the more distant feature 37.

The IR detector circuit 15 provides data 40 indicating the disposition of a feature of each of the person's eyes 22L, 22R, such as the pupil 38 and thereby the spatial relationship of features of the person's eyes 22L, 22R to the computer 12 in response to detecting light reflected by the person's eyes 22L, 22R; and the computer 12 provides focus-control signals 42 to the variable-focus-lens driver circuits 13 in response to processing such data 40 to thereby regulate the variable-focus lens 11L, 11R in accordance with the indicated spatial relationship.

The operation of a preferred embodiment of the system of FIG. 1 is described with reference to FIG. 3, in which (a) the computer 12 includes a neural network 44; and (b) a manual calibration circuit 46 is connected to the computer 12.

As a first step 48, an IR pulse is provided from the IR source circuit 14 through only one optical fiber 30L, 30R at a time in each of the respective left and right fiber-optic transmitter arrays 30L, 30R to provide a pair of light pulses that are respectively and simultaneously reflected off of the person's left and right eyes 22L, 22R and detected as a second step 50 by the IR detector circuit 15 from all of the optical fibers in the respective left and right fiber-optic detector arrays 32L, 32R. The series of the first and second steps 48 and 50 is continuously repeated with the light pulses being provided from a different optical fiber 30L, 30R of each of the respective left and right fiber-optic transmitter arrays 30L, 30R during each series to provide repetitive sequences of the series of first and second steps 48, 50 in which a light pulse is provided from each optical fiber 30L, 30R of each of the left and right fiber-optic transmitter arrays 30L, 30R and detected by the respective left and right fiber-optic detector arrays 32L, 32R. The light patterns detected by the combination of the left and right fiber-optic detector arrays 32L, 32R indicate the relative disposition of the pupils 38 of the person's left and right eyes 22L, 22R. By using a complete sequence of the repeated series of the first and second steps 48, 50 in which the light pulses are provided from each of the different optical fibers 30L, 30R of each of the left and right fiber-optic transmitter arrays 30L, 30R, a more accurate indication of the spatial relationship of features of the person's eyes is provided.

The IR detector circuit 15 responds to the combination of light patterns detected during each sequence of the series of first and second steps 48, 50 by providing to the: computer 12 disposition of a feature data 40L indicating the disposition of the left eye 22L and disposition data 40R indicating the disposition of the right eye 22R The combined disposition data 40L, 40R indicates the spatial relationship of features of the person's eyes 22L, 22R both with respect to each other and with respect to the eyeglasses 10 with which the person 20 is gazing.

The neural network 44 in the computer 12 processes the disposition data 40L, 40R to provide a left focus-control signal 42L for setting the focus of the left variable-focus lens 11L and a right focus-control signal 42R for setting the focus of the left variable-focus lens 11R in accordance with the spatial relationship between the left eye 22L and the right eye 22R indicated by the combined disposition data 40L, 40R for both eyes. The left-lens driver circuit 13L and the right-lens driver circuit 13R apply voltages to the plates of the liquid crystal displays of the left-variable focus lens 11L and the right variable-focus lens 11R in accordance with the respective left and right focus-control signals 42L, 42R to thereby focus the left variable-focus lens 11L and the right variable-focus lens 11R to cause the person 20 to sense an at least partially in-focus image of the feature 36, which is located at the vertex of the directions-of-sight-convergence angle for the person's eyes 22L, 22R.

Prior to using the eyeglasses 10, the neural network 44 is calibrated to cause the person to sense an at least partially in-focus image of a feature at a given location with respect to the person's eyes when the person's eyes have a given relative disposition. Such. calibration is effected through use of the manual calibration circuit 46, which the person wearing the eyeglasses 10 operates to cause the neural network 44 to provide combinations of a left focus-control signal 42L and a right focus-control signal 42R that so set the left variable-focus lens 11L and the right variable-focus lens 11R respectively as to cause the person 20 to sense an at least partially in-focus image of a plurality of different features 34, 35, 36, 37 at different given locations with respect to the person's eyes 22L. 22R when the features of the person's eyes have different given relative dispositions as indicated by the eye disposition data 40L. 40R for both eyes when the person 20 gazes at the respective different features 34, 35, 36, 37 at the different locations.

In an alternative embodiment, in which the computer 12 does not include a neural network, the computer 12 processes the combined disposition data 40L. 40R for both eyes to measure a given parameter of the relative disposition of features of the person's eyes 22L, 22R, such as the distance between the pupils 38 of the person's eyes and regulates the focus of the variable-focus lens 11L, 11R by providing the left and right focus-control signals 42L, 42R to the left-lens driver circuit 13L and the right-lens driver circuit 13R from a look-up table in the computer 12 in accordance with the parameter measurement to thereby set the left and right variable-focus lenses 11L, 11R at one of a plurality of different predetermined focus settings in accordance with the spatial relationship between the person's eyes 22L, 22R indicated by the parameter measurement. In this alternative embodiment, the look-up table is prepared by a calibration procedure in which the person wearing the eyeglasses 10 operates a manual calibration circuit to store in the look-up table such combinations of a left focus-control signal 42L and a right focus-control signal 42R as set the left variable-focus lens 11L and the right variable-focus lens 11R respectively as to cause the person 20 to sense an at least partially in-focus image of a plurality of different features 34, 35, 36, 37 at different given locations with respect to the person's eyes 22L. 22R in accordance with the different parameter measurements made when the person 20 gazes at the respective different features 34, 35, 36, 37 at the different locations.

Figure 3:
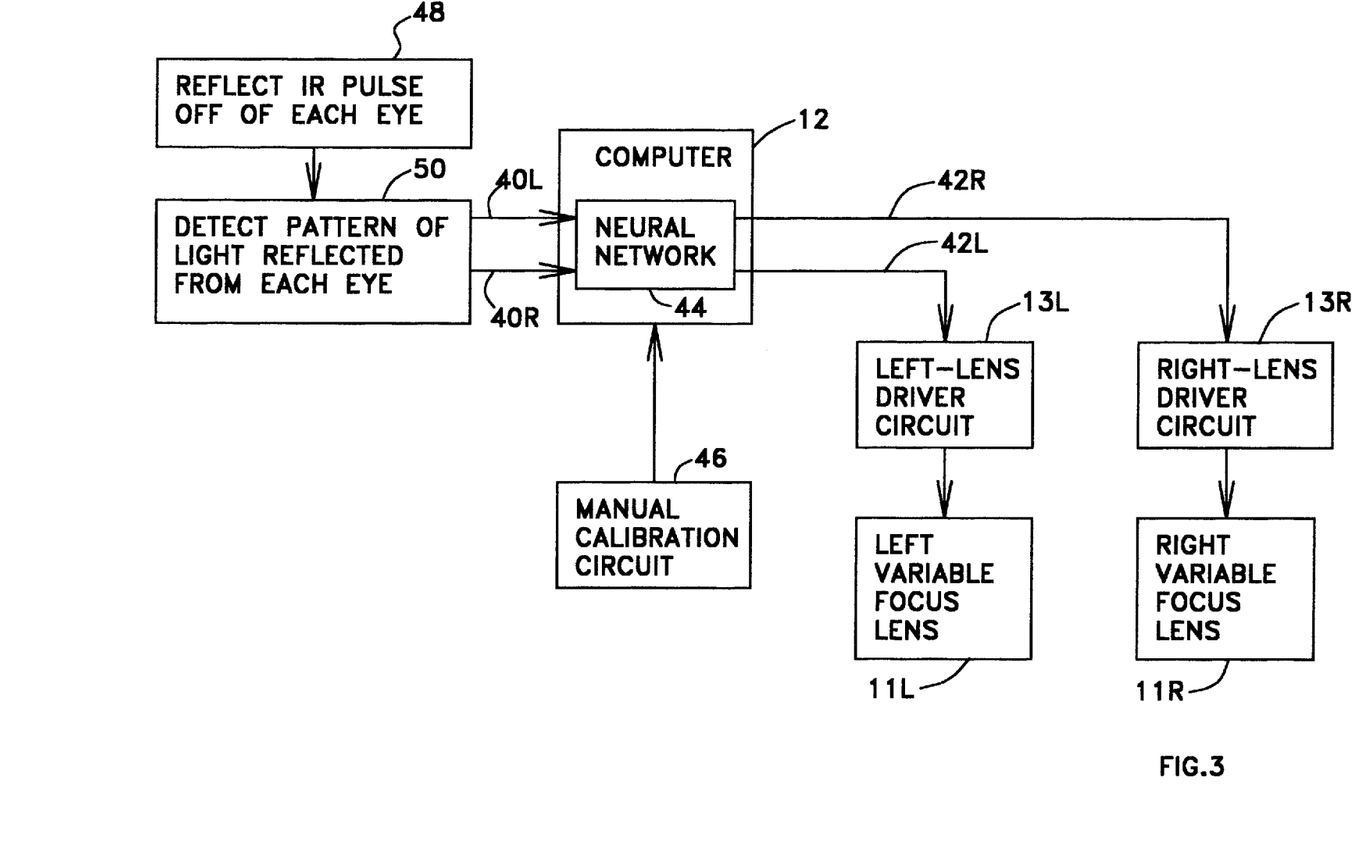
FIG. 3 is a block diagram showing the operation of the system of FIG. 1.
Figure 4:
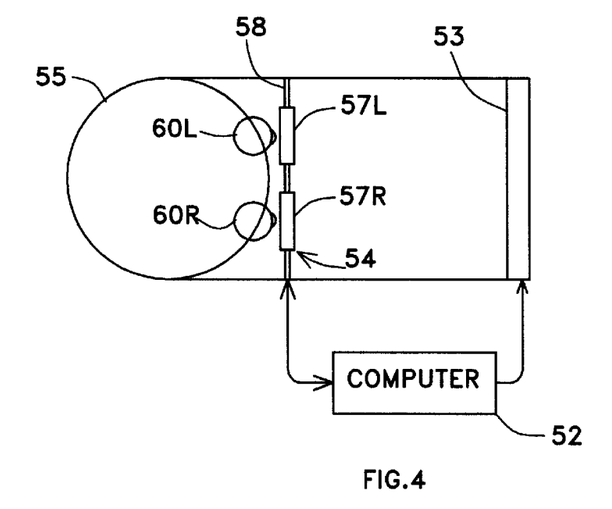
FIG. 4 is a schematic diagram of an embodiment of an image-focussing system according to the present invention that is included in a three-dimensional virtual reality system.

Referring to FIG. 4, an embodiment of an image focussing system according to the present invention is included a three-dimensional virtual reality system that includes a computer 52 for generating left-eye-image components and right-eye-image components, a display screen 53 for displaying the computer-generated image components and goggles 54 for enabling a person 55 gazing at the display screen 53 through the goggles 54 to view three-dimensional images having virtual features that respectively appear to be at different distances from the person 55. The lenses 57L, 57R of the goggles 54 are nematic liquid crystal display devices such as included in the eyeglasses 10 in the embodiment described above with reference to FIGS. 1–3; and lens driver circuits (not shown) are connected to the conductive plates of such liquid crystal display devices by wires extending through the frame 58 of the goggles 54 in order to selectively apply appropriate control voltages to the respective conductive plates of the liquid crystal display devices. These control voltages are so applied as to cause the nematic liquid crystals to align to form an array of vertical shutters that are selectively disposed within each lens 57L, 57R so that the left lens 57L of the goggles 54 is adapted to shutter the displayed right-eye-image components from view by the person's left eye 60L and the right lens 57R is adapted to shutter the displayed left, eye-image components from view by the person's right eye 60R in order to provide a three-dimensional image to the person wearing the goggles 54. In order to provide improved resolution, the displayed positions of the left-eye image components may be periodically interchanged with the displayed positions of the right-eye image components, with the shutters being changed when the displayed positions of the image components are interchanged so that each eye views an image having twice the resolution as would otherwise be provided.

In order to provide an indication of both the spatial relationship of features of the person's eyes and the lateral location of the virtual feature at which the person 55 wearing the goggles 54 is gazing, a pair of left and right fiber-optic transmitter arrays (not shown) are respectively disposed in the portions of the goggles frame 58 that surround the[]left lens 57L and the right lens 57R; and a pair of left and right fiber-optic detector arrays (not shown) are alternately disposed with the optical fibers of the respective fiber-optic transmitter arrays in the portions of the goggles frame 58 that surround the left lens 57L and the right lens 57R, with such arrays being so disposed in the same manner as the like arrays are disposed in the eyeglasses frame 28, as shown in FIG. 2. An IR source circuit (not shown) is coupled by a bundle of optical fibers to the pair of left and right fiber-optic transmitter arrays; and an IR detector circuit (not shown) is coupled by another bundle of optical fibers to the pair of left and right fiber-optic detector arrays in the same manner as described above with reference to FIGS. 1 and 2.

The IR detector circuit provides data indicating the disposition of features of each of the person's eyes 60L, 60R, and thereby the spatial relationship of features of the person's eyes 60L, 60R to the computer 52 in response to detecting light reflected by the person's eyes 60L, 60R in the same manner as described above with reference to FIGS. 1–3. The computer 52 responds to the eye disposition data received from the IR detector circuit by providing lens control signals to the lens driver circuits in accordance with the lateral location of the virtual feature at which the person 55 wearing the goggles 54 is gazing so as to cause the lens driver circuits to so set the positions of the shutter arrays provided within the respective left and right lenses 57L, 57R that a three-dimensional image is provided to the person wearing the goggles 54.

In one embodiment of the system of FIG. 4, the computer 52 regulates the focus of the virtual features displayed by the monitor 53 as perceived by the person 55 wearing the goggles 54, with such regulation being effected by the compositions of the respective left-eye-image components and right-eye-image components generated by the computer 52. In this embodiment, the computer 52 responds to the eye disposition data received from the IR detector circuit by generating respective left-eye-image components and right-eye-image components that cause the monitor 53 to display an at least partially in-focus image of the virtual feature at which the person 55 wearing the goggles 54 is gazing, as perceived by the person 55 wearing the goggles 54, in accordance with the spatial relationship of features of the person's eyes 60L, 60R indicated by the eye disposition data.

In an alternative embodiment of the system of FIG. 4, the lenses 57L, 57R of the goggles 54 are variable focus lenses, such as the lenses 11L, 11R included in eyeglasses 10 described with reference to FIGS. 1–3. In this alternative embodiment the control signals provided by the computer 52 to the lens driver circuits also include focus-control components that are provided by the computer 52 in response to the eye disposition data received from the IR detector circuit to thereby regulate the variable-focus lenses 57L, 57R to cause the person 55 wearing the goggles 54 to perceive an at least partially in-focus image of the virtual feature at which the person 55 is gazing in accordance with the spatial relationship of features of the person's eyes 60L, 60R indicated by the eye disposition data.

In both embodiments of the system of FIG. 4, the computer 52 includes a neural network and a calibration circuit is connected to the computer 52 as described above for the eyeglasses embodiment with reference to FIG. 3.

Figure 5:
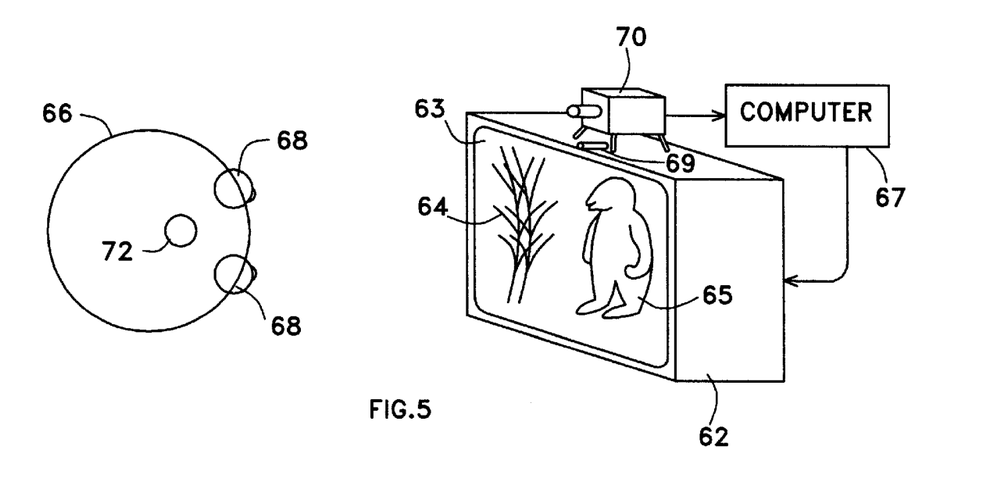
FIG. 5 is a schematic diagram of an embodiment of an image-focussing system according to the present invention that is used with a monitor that simultaneously displays different features with different degrees of focus as though they were at different distances from a person viewing the monitor.

Referring to FIG. 5, an embodiment of an image focussing system according to the present invention is used with a display monitor 62 having a screen 63 that perceptually simultaneously displays different features 64, 65 with different degrees of focus as though they were at different distances from a person 66 viewing the monitor 62 to thereby provide an image that is perceived by the person 66 as a three-dimensional image. In an exemplary displayed image, one feature 64 is a tree and another feature 65 is a bear that appears to be at a greater distance than the tree 64 from the person 66 viewing the monitor 62. The focus of the respective displayed features 64, 65 is regulated by a computer 67 that controls the generation of the image displayed by the monitor 62. In this exemplary embodiment, the displayed image of the tree 64 is not in focus and the displayed image of the bear 65 is in focus. The displayed image does not necessarily include both a left-eye image component and a right-eye image component, and in one embodiment it does not. An alternative embodiment of a three-dimensional display system that does not require special glasses for viewing displayed images that do include both a left-eye image component and a right-eye image component is described in International Publication No. WO 95/05052.

In order to provide an indication of the spatial relationship of features of the person's eyes 68, an IR source 69 and a video camera 70 are disposed adjacent the display screen 63 of the monitor 62 and an IR reflector 72 is temporarily disposed on the forehead of the person 66. IR light directed from the IR source 69 toward the person 66 is reflected from the eyes 68 of the person 66 and the IR reflector 72 and detected by the video camera 70. Eye disposition of features data signals indicating the spatial disposition of the eyes 68 of the person. 66 are provided to the computer 67 in response to the reflected IR light detected by the video camera 70. In an alternative embodiment of the system of FIG. 5, an indication of the spatial relationship of features of the person's eyes 68 is provided by utilizing fiber-optic transmitter arrays and fiber-optic detector arrays disposed in the frames of glasses (not shown) to provide eye disposition data signals in the same manner as in the eyeglasses embodiment described above with reference to FIGS. 1–3. In this alternative embodiment, the lenses of the glasses are not variable-focus lenses, but rather are glass or plastic lenses shaped in accordance with the prescription for glasses normally worn by the person. If the person does not wear glasses, the lenses may be omitted from the frames, or clear glass or plastic may be inserted therein. Alternatively, the lenses of the glasses may include liquid crystal shutters for alternate viewing of left-and-right-eye images.

In both embodiments of the system of FIG. 5, the computer 67 regulates the respective focus of the displayed features 64, 65 by so responding to the eye disposition data as to cause the display monitor 62 to display an at least partially in-focus image of the feature 64, 65 at which the person is gazing in accordance with the spatial relationship of features of the person's eyes 68 indicated by the eye disposition data.

Figure 6:
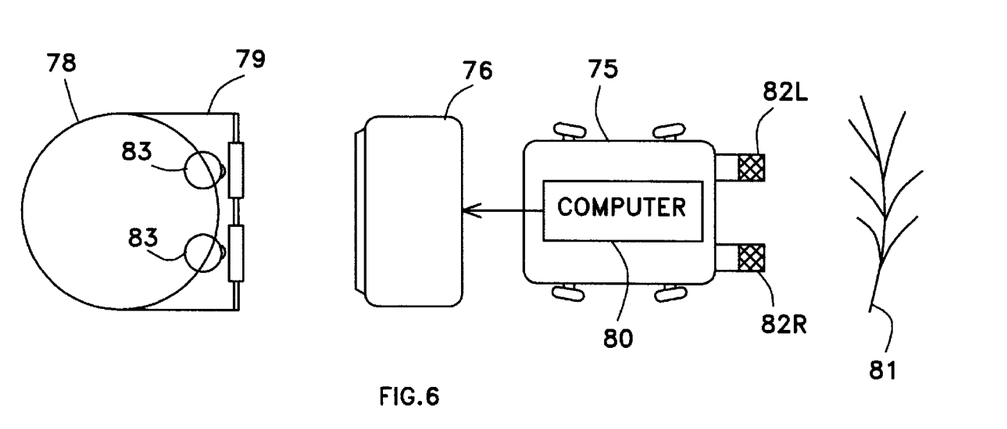
FIG. 6 is a schematic diagram of an embodiment of an image-focussing system according to the present invention that is used with a remotely controlled device that produces and transmits to a display monitor images of features at which a person viewing the monitor is gazing.

Referring to FIG. 6, an embodiment of an image focussing system according to the present invention is used with a remotely controlled device 75 that produces and transmits to a display monitor 76, such as a television monitor, an image signal for causing the monitor 76 to display an image that a person 78 viewing the monitor 76 through 3D-TV-viewing glasses 79 perceives as three dimensional. The 3D-TV-viewing glasses 79 may be of the well-known type in which one lens includes a red filter and the other lens includes a blue filter.

The respective focus of the various features 81 included within the displayed image is regulated by a computer 80. Preferably the remotely controlled device 75 is mobile and the computer 80 is contained within the remotely controlled device 75. The remotely controlled device 75 includes a left variable-focus lens 82L and a right variable-focus lens 82R, wherein the respective focus of each lens 82L, 82R is controlled by the computer 80. The images respectively produced by the left variable-focus lens 82L and the right variable-focus lens 82R are processed electronically by the computer 80 to produce the image signal that is transmitted to the display monitor 75 by the remotely controlled device 75.

An indication of the spatial relationship of features of the person's eyes 83 is provided by utilizing fiber-optic transmitter arrays (not shown) and fiber-optic detector arrays (not. shown) disposed in the frames of the 3D-TV-viewing glasses 79 to provide eye disposition data signals in the same manner as in the eyeglasses embodiment described above with reference to FIGS. 1–3. In the embodiment of FIG. 6, the lenses of the 3D-TV-viewing glasses 79 are not variable-focus lenses.

In an alternative embodiment of the system of FIG. 6 in which the image signal produced by the computer 80 causes the display monitor 76 to display an image that can be viewed as a three-dimensional image without having to wear the 3D-TV-viewing glasses 79, the person 78 views the displayed image through glasses such as those used in the above-described alternative embodiment of the system of FIG. 5, in which an indication of the spatial relationship of features of the person's eyes 83 is provided by utilizing fiber-optic transmitter arrays and fiber-optic detector arrays disposed in the frames of glasses to provide eye disposition of features data signals indicating the spatial disposition of the viewer's eyes. 83 in the same manner as in the eyeglasses embodiment described above with reference to FIGS. 1–3. In this alternative embodiment, the lenses of the glasses are glass or plastic lenses shaped in accordance with the prescription for glasses normally worn by the person; and if the person does not wear glasses, the lenses may be omitted from the frames, or clear glass or plastic may be inserted therein.

The computer 80 responds to the eye disposition data by regulating the setting of the variable focus lenses 82L, 82R of the remotely controlled device 75 so that the image signal produced by the computer 80 upon processing the images respectively produced by the variable focus lenses 82L, 82R causes the display monitor 75 to display an image in which the feature 77 at which the person 78 is gazing is at least partially in focus as perceived by the person 78.

An optional feature of the system of FIG. 6 is that the computer 80 also responds to the eye disposition data by causing the mobile remotely controlled device 75 to move toward or away from the feature 81 at which the person 78 wearing the glasses 79 is gazing by whatever distance is necessary to enable an at least partially in-focus image of the feature 81 to be provided by regulating the setting of the variable-focus lenses 82L, 82R as described above.

Figure 7:
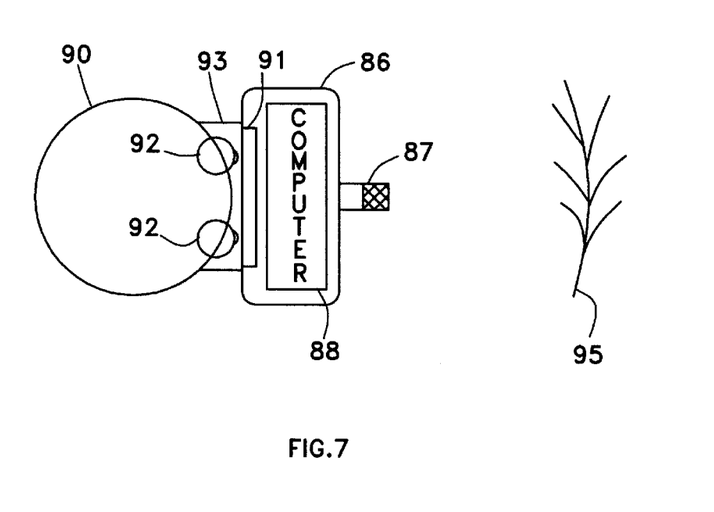
FIG. 7 is a schematic diagram of an embodiment of an image-focussing system according to the present invention, wherein the variable focus means are embodied in a camera to provide at the focal plane of the camera a focussed image of a feature at which a person is gazing through a view finder of the camera.

Referring to FIG. 7, an image focussing system according to the present invention is used in a camera 86 having a variable focus lens 87. The setting of the variable focus lens 87 is regulated by a computer 88 contained within the camera 86. Upon the shutter of the camera being opened, film disposed at the focal plane of the camera is exposed to an image being viewed by a person 90 through a view finder 91 of the camera 86. The view finder 91 enables the image viewed therethrough to be viewed by both eyes 92 of the person 90.

A hood 93 is disposed around the view finder 91 so that the eyes 92 of the person 90 can be maintained in a constant position in relation to the view finder 91 by resting the hood 93 against the person's head about the eyes 92; and fiber-optic transmitter arrays (not shown) and fiber-optic detector arrays (not shown) are disposed within the hood 93 around the view finder 91 in order to provide eye disposition data signals indicating the spatial disposition of features of the viewer's eyes 92 in generally the same manner as in the eyeglasses embodiment described above with reference to FIGS. 1–3.

The computer 88 responds to the eye disposition data signals by so regulating the focus of the variable focus lens 87 that an at least partially in-focus image of a feature 95 at which the person 90 is gazing through a view finder 91 of the camera. 86 is provided at the focal plane of the camera 86.

In other alternative embodiments (not shown), (a) data indicating the dispositions of features Of the person's eyes may be provided by detecting sound waves, electromagnetic radiation, magnetic attraction, gravitational attraction, inductance and/or capacitance instead of, or in addition to, detecting reflected light; (b) the means for reflecting light directed toward the eye may include contact lenses, ocular contact means, intraocular lenses and/or eye inserts instead of, or in addition to, the person's eyes; (c) data indicating the dispositions of features of the person's eyes may be communicated from the detection means by sound waves and/or electromagnetic radiation, such as light or microwave, instead of, or in addition to wire; (d) communication of the focus-control signals may be communicated by sound waves and/or electromagnetic radiation, such as light or microwave, instead of, or in addition to wire; and (e) the variable-focus lenses may be embodied in binoculars and microscopes adapted for sensing three-dimensional images.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

I claim:

1. A system for providing an at least partially in-focus image of a feature at which a person is gazing, comprising
   variable-focus means for providing an image of the feature on a display screen;
   means for indicating a spatial relationship of features of the person's eyes; and
   means for regulating the variable-focus means in accordance with the indicated relationship.

2. A system according to claim 1, wherein the variable focus means and the regulating means comprise a computer for generating left-eye-image components and right-eye-image components in accordance with the indicated relationship, and a display screen for displaying said computer-generated image components.

3. A system according to claim 2, further comprising goggles for enabling a person gazing at the display screen through the goggles to view images having features that respectively appear to be at different distances from said person.

4. A system according to claim 2 included in a three-dimensional virtual reality system that includes goggles for enabling a person gazing at the display screen through the goggles to view three-dimensional images having virtual features that respectively appear to be at different distances from said person.

5. A system according to claim 1, wherein the variable-focus means are embodied in a display monitor that perceptually simultaneously displays different features on the display screen with different degrees of focus as though they were at different distances from a person viewing the monitor.

6. A system according to claim 5, wherein the variable-focus means are regulated to display an at least partially in-focus image of the feature at which the person is gazing.

7. A system according to claim 1, wherein the indicating means comprise
   means for providing data indicating the disposition of a feature of each eye; and
   means for combining said disposition data to provide an indication of the relative spatial relationship of the person's eyes.

8. A system according to claim 1, wherein the indicating means comprise means for providing data indicating the disposition of a feature of each eye; and
   wherein the regulating means comprise a neural network for processing said disposition data to provide control signals for setting the focus of the variable focus means.

9. A system according to claim 1, wherein the indicating means indicate the spatial relationship of features of the person's eyes with respect to each other.

10. A method of providing an at least partially in-focus image of a feature at which a person is gazing, comprising the steps of:
    (a) using variable-focus means to provide an image of the feature on a display screen;
    (b) indicating a spatial relationship of features of the person's eyes; and
    (c) regulating the variable-focus means in accordance with the indicated relationship.

11. A method according to claim 10, farther comprising the step of:
    (d) disposing the variable-focus means in such a correlation to the person's eyes as to affect the person's perceived focus of images.

12. A method according to claim 10, wherein step (b) comprises the steps of:
    (d) providing data indicating the disposition of a feature of each eye; and
    (e) combining said disposition data to provide an indication of the relative spatial relationship of the person's eyes.

13. A method according to claim 10 wherein step (b) comprises the steps of:
    (d) providing data indicating the disposition of a feature of each eye; and wherein step (c) comprises the step of:
    (e) processing said disposition data with a neural network to provide control signals for setting the focus of the variable focus means.

14. A method according to claim 10, wherein step (b) comprises the step of:
    (d) indicating the spatial relationship of features of the person's eyes with respect to each other.

15. A method according to claim 10, wherein step (b) comprises the steps of.
    (d) detecting reflected light: and
    (e) processing the reflected light to provide the indication of the spatial relationship of features of the person's eyes.

16. A method according to claim 15, wherein step (d) comprises the step of:
    (f) detecting light reflected by the person's eyes.

17. A method according to claim 10, wherein step (c) comprises the steps of:
    (d) providing focus-control signals in accordance with the indicated relationship; and
    (e) focusing the variable-focus means in accordance with the focus-control signals to cause the person to sense said at least partially in-focus image of the feature.

18. A method according to claim 10, further comprising the step of:
    (d) calibrating the means of said regulating to cause the person to sense an at least partially in-focus image of a feature at a given location with respect to the person's eyes when the features of the person's eyes have a given relative disposition.

19. A method according to claim 10, wherein steps (a) and (c) comprise the steps of:
    (d) generating left-eye-image components and right-eye-image components by a computer in accordance with the indicated relationship, and
    (e) displaying said computer-generated image components.

20. A method according to claim 19, further comprising the step of:
    (f) using goggles while gazing at the display screen to view images having features that respectively appear to be at different distances from said person.

21. A method according to claim 19, further comprising the step of:

(f) using goggles while gazing at the display screen to view three-dimensional images having virtual features that respectively appear to be at different distances from said person.

22. A method according to claim 10, wherein steps (a) and (c) comprise the step of:

(d) perceptually simultaneously displaying different features with different degrees of focus as though they were at different distances from a person viewing the display screen.

23. A method according to claim 22, wherein step (d) comprises the step of:

(e) displaying an at least partially in-focus image of the feature at which the person is gazing.

24. A system, comprising a computer for generating left-eye-image components and right-eye-image components, a display screen for displaying said computer-generated image components, goggles for enabling a person gazing at the display screen through the goggles to view three-dimensional images having virtual features that respectively appear to be at different distances from said person, means for indicating a spatial relationship of features of the person's eyes; and means for regulating the goggles in accordance with the indicated relationship to provide said three-dimensional images to the person wearing the goggles.

25. A system, comprising a display monitor that perceptually simultaneously displays images of different features with different degrees of focus as though they were at different distances from a person viewing the monitor and gazing at one of said displayed features, means for indicating a spatial relationship of features of the person's eyes; and means for regulating the display monitor in accordance with the indicated relationship to display an at least partially in-focus image of the feature at which the person is gazing.

26. A system, comprising a remotely controlled device that produces and transmits to a television monitor a signal for causing the monitor to display an at least partially in-focus image of a feature at which a person viewing the monitor is gazing;

variable-focus means embodied in the remotely controlled device for providing an image of the feature from which said transmitted signal is produced;

means for indicating a spatial relationship of features of the person's eyes; and means for regulating the variable-focus means in accordance with the indicated relationship.

27. A system, comprising a camera having a focal plane and a view finder; variable-focus means embodied in the camera for providing an at least partially in-focus image of a feature at which a person is gazing through the view finder;

means for indicating a spatial relationship of features of the person's eyes; and means for regulating the variable-focus means in accordance with the indicated relationship to provide at the focal plane of the camera the at least partially in-focus image of the feature at which the person is gazing through the view finder of the camera.

* * * * *